Sept. 4, 1956     P. C. GEHRING ET AL     2,761,351
INDICATING SYSTEM FOR READING FILM
Filed June 26, 1952
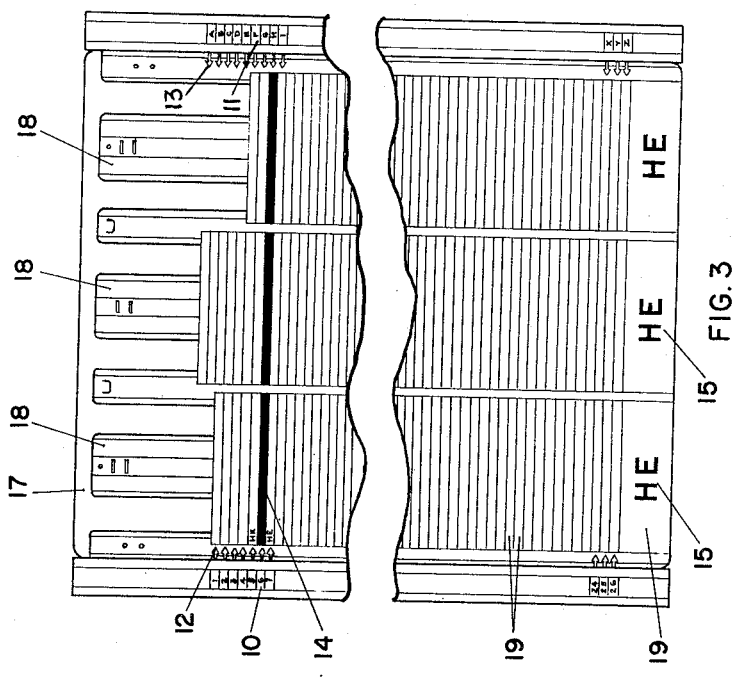
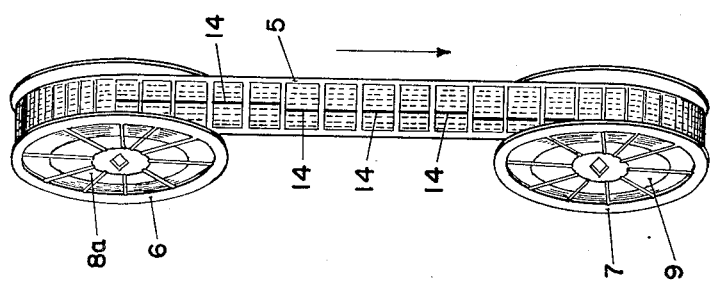
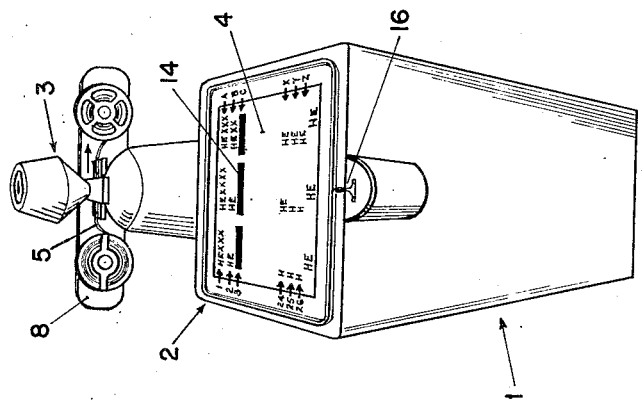
INVENTOR
P.C. GEHRING — H.C. SCHWALM
BY Philip M. Bolton
ATTORNEY

United States Patent Office 2,761,351
Patented Sept. 4, 1956

2,761,351

INDICATING SYSTEM FOR READING FILM

Paul C. Gehring, Brooklyn, N. Y., and Horacio C. Schwalm, Havana, Cuba, assignors to International Standard Electric Corporation, New York, N. Y., a corporation of Delaware Application June 26, 1952, Serial No. 295,735

2 Claims. (Cl. 88—24)

This invention relates to a system for rapidly reading film, and particularly to methods and means for reading film power driven at high speeds.

Since the innovation of microfilm, there has been exerted continuous effort to develop means to permit rapid reading of microfilm. Generally, little success has been achieved in this endeavor. The usual method for reading microfilm consists of projecting the microfilm on a viewing screen, whereby it is read, or at least the desirable information is extracted while the negative is being projected. Successively, frames are manually positioned and projected, and read until all desired information is obtained from the microfilm. This method of reading is extremely fatiguing, time consuming, and thus expensive.

Recently, there was proposed a method for reading film moving at high speed by power drive. According to this method the film is driven to move toward the viewer, that is, up or down in front of the observer, or toward him at an angle or in the horizontal plane. This method provides for indexing the viewing screen transversely of the observer along its upper edge, and provides index lines on the microfilm longitudinally thereof. The index lines on the film are given discreet lateral positions (that is, lateral with respect to the frames) so that at any one instant of time, the index line will be aligned with a particular denomination indicated on the index. The film is projected on the viewing screen, and the film moved at a speed sufficient to blur out the printed matter on the projections so that only the vertical index lines are readable. When the index line is aligned with the desired index denomination, the desired frame is in near proximity to the viewing position and may be found by slowing the movement of the film. The index line may extend diagonally across the matter recorded on the film, but since the film is relatively long, the portion appearing at the viewing screen will appear to be substantially vertical.

Although the above discussed proposal is an advancement in the art, there are certain inherent shortcomings which deter the efficiency of the operator. In particular, one such shortcoming is that the psychological effect of the projected images, and particularly the index line, moving toward the operator produces unpleasant psychological effects. Since the viewing screen is generally inclined, with the lowermost portion at approximately the height of the reader's abdomen, the movement of the images, and thus, the indexing line, gives the effect of advancing directly into the abdomen of the operator making these effects more pronounced.

Another shortcoming stems from the fact that each microfilm frame is a picture of a composite page made up of a plurality of transverse lines corresponding to the lines of print on the pages of the subject matter indexed. The diagonal index line thus may obliterate some portions of the subject matter.

It is the object of this invention to overcome each of the above-mentioned shortcomings and to provide an index system for film records which permits faster and simpler location of matter to be read than any heretofore known.

It is a feature of this invention to provide an indexing system for reading microfilm which is especially adaptable at telephone exchange information desks.

In accordance with the broad aspect of this invention there is provided a method and means for indexing and reading film. The film has indicia thereon extending substantially parallel with respect to the lines of subject matter on the film. The method comprises projecting an image of the film on a viewing screen, rapidly moving the film so that the projections move transversely of the viewer at a speed so rapid as to render only the indicia readable, and then stopping the film when the index indicia reaches a predetermined position wherein the desired frame may be read.

In accordance with a more limited aspect of applicants' invention, there is provided an indexing system for reading film comprising a viewing screen having indexing means positioned along one vertical side thereof. The film is projected to a directly-readable size on the screen. The film is provided with indicia means, which is horizontally positioned with respect to the recorded matter on the film, and is power driven transversely of the viewer at a speed so rapid as to render only the indicia means readable. When the indicia is in a given position with respect to the index, the film is stopped and the desired frame is indicated.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 illustrates in perspective an indicating machine which permits reading of the film;

Fig. 2 is an enlarged view of the film; and

Fig. 3 illustrates the viewing area of the machine shown in Fig. 1.

Although this invention has particular utility at telephone exchange information desks, as will be described hereinafter, it is to be understood that the invention can be used satisfactorily for information lists, directories and catalogs without departing from the spirit and scope of the invention.

Referring now to Fig. 1, there is shown an indicating machine for reading film, comprising an optical viewing machine 1, of a known type. While the usual machine of this type is provided for reading microfilm, and operates by light passing through the film, it will be clear that opaque film may be used and the projection made by reflected light. For convenience of illustration, the example shown and described is directed to a microfilm system. The machine 1 comprises essentially a viewing screen 2 which, by way of example may be ground glass, and a projection system 3. The projection system 3 projects an image 4 of the microfilm 5 on the viewing screen 2. As best seen in Fig. 2, the microfilm 5 is wound on reels 6 and 7 respectively, and actuated by power driven means contained in housing 8, in a well known manner.

The reels 6, 7 preferably but not necessarily include dummy cores 8a, 9, respectively to keep the variations of film speed at a minimum. The film is preferably projected to a directly-readable size on the screen 2 and moved in the direction of the arrow, shown in Figs. 1 and 3. For simplicity this direction of movement is referred to hereinafter as horizontal, and the transverse direction as vertical.

The viewing screen 2, as best seen in Fig. 3, comprises indexing means 10, 11 positioned along the vertical sides thereof. The indexing means 10, 11 may be divided horizontally into discrete denominations; e. g., indexing means 11 may be divided to indicate the letters of the alphabet from A through Z, and indexing means 10 may indicate the numbers from 1 through $n$ with $n$ being any desired integer. The indexing means 10, 11 are preferably provided with pointers 12, 13 respectively.

A first indicia means is provided on the film 5 and positioned horizontally with respect to the frames of the film. The indicia means comprises a horizontal line 14 extending across the picture frames and positioned to indicate a particular denomination existing on each frame. Thus, over the entire film, the horizontal line will be discontinuous, taking different lateral positions relative to the denomination it is intended to indicate. The separation of the horizontal lines relative to each other will be determined by the division of the indexing means 10, 11 so that at any one instant of time, preferably only one horizontal line will be aligned with an index denomination. This is shown by the lines 14 in Fig. 2. A second indicia means 15 is positioned at the bottom of the film to indicate additional information with regard to the denomination. The power driven means contained in housing 8 (Fig. 1) rapidly moves the film horizontally, and thus the projected images move across the viewing screen at a speed rendering the horizontal line 14 readable; e. g., at a speed which renders the readable matter blurred. A speed control lever 16 is provided on the machine 1 to control the speed of the film and to slow up the film when the denomination indicated by the horizontal line 14 is aligned with the given denomination of one of said indices. The film is slowed up sufficiently to render the second indicia means 15 readable, and when the film is at a desired position as indicated by the second indicia, the film may be slowed or stopped.

In the application of this invention to the telephone exchange information desks, the information operator controls the general operation of the machine. The microfilm consists of the photographed pages of the telephone directory and the film is marked with the horizontal line. When the operator is given the subscriber's name, and is asked for his telephone number, she causes the film projections to move rapidly in front of her until the horizontal line becomes aligned with the letter on the index corresponding to the first letter of the subscriber's name. When the proper letter is indicated (or alignment made), the operator slows up the movement of the film, rendering readable the additional indicia contained at the bottom of the particular page, which may be successive letters of subscriber's names. The film is stopped at the desired page. Thus in relatively few seconds the operator can determine the information desired.

The film consists of photographs of a plurality of formats, each of which constitutes a page of listed information. The format as best seen in Fig. 3, comprises a frame 17 having attached thereto a plurality of tracks 18 on which cards 19 are removably attached and nested together. This type of format is well known, and is useful, particularly where there is likely to be frequent alterations in the listed information to be indexed. The indexing line may be formed on one card in each information column and positioned to align with the desired index marking.

Although the invention has been described primarily in connection with the telephone information exchange desk, its versatile utility should at once be obvious to one skilled in the art. For example, in the banking system, a listing of depositors or investors may be recorded as above described, and information on any one depositor or investor may be quickly obtainable in accordance with the principles of the invention. Cataloging of parts, prices, etc. may also be accomplished in the above described manner.

The machine may be used to read film having different scales or denominations of indicia by providing removable viewing screens, each having different indexing markings to correspond with the indicia on the film to be read.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An indexing system for reading film having recorded matter thereon, comprising a viewing screen having indexing means positioned along one side thereof and extending in a given direction perpendicular to the bottom of the frames of said film, the indexing means being divided along its extension into discrete denominations, means for projecting an image of said film to a directly-readable size on said screen, a first indicia means on said film positioned to extend in a second direction perpendicular to said given direction, said indicia means comprising a line extending across the frames of said film, said line being positioned to indicate a given denomination existing on each of the frames, power driving means for moving said film rapidly in said second direction with a speed greater than that at which said recorded matter is readable but within the range of speed at which said line can be followed, means for slowing up said film when the denomination indicated by the line is aligned with a given denomination of said index, and means for stopping said film at a desired position.

2. The system according to claim 1 and further comprising a second indicia means located at the bottom of the film frames to indicate further information of said denomination.

References Cited in the file of this patent

UNITED STATES PATENTS

| | | |
|---|---|---|
| Re. 22,517 | Hopkins | July 18, 1944 |
| 2,147,499 | Ross | Feb. 14, 1939 |
| 2,209,267 | Gorochov | July 23, 1940 |
| 2,464,220 | Duncan | Mar. 15, 1949 |